United States Patent [19]

Schilz et al.

[11] Patent Number: 4,567,484

[45] Date of Patent: Jan. 28, 1986

[54] DOPPLER RADAR MEASURING APPARATUS

[75] Inventors: Wolfram Schilz, Norderstedt; Burkhard Schiek, Bochum/Querenburg, both of Fed. Rep. of Germany

[73] Assignee: U.S. Philips Corporation, New York, N.Y.

[21] Appl. No.: 611,926

[22] Filed: May 18, 1984

Related U.S. Application Data

[63] Continuation of Ser. No. 491,005, May 3, 1983, abandoned, which is a continuation of Ser. No. 216,466, Dec. 15, 1980, abandoned.

[30] Foreign Application Priority Data

Dec. 15, 1979 [DE] Fed. Rep. of Germany ....... 2950626

[51] Int. Cl.$^4$ .................. G01S 13/00; G01S 13/26; G01S 13/34
[52] U.S. Cl. .................. 343/14; 343/5 PD
[58] Field of Search ............ 343/5 PD, 5 AF, 7 PF, 343/7.7, 12 R, 14, 17.5; 340/553, 554

[56] References Cited

U.S. PATENT DOCUMENTS

| | | | |
|---|---|---|---|
| 2,236,893 | 5/1941 | Chaffee | 343/14 |
| 3,132,340 | 5/1964 | Galejs | 343/14 |
| 3,168,735 | 2/1965 | Cartwright | 343/14 |
| 3,189,899 | 6/1965 | Slater | 343/14 |
| 3,271,755 | 9/1966 | Bagno | 343/5 PD |
| 3,581,310 | 5/1971 | Buckley | 343/7.7 |
| 3,761,908 | 9/1973 | Gehman | 343/5 PD |
| 3,796,989 | 3/1974 | Ravas et al. | 343/5 PD |
| 4,035,798 | 7/1977 | Hackett | 343/5 PD |
| 4,142,189 | 2/1979 | Gleason | 343/9 |

OTHER PUBLICATIONS

Skolnik, Radar Handbook, Sect. 16.10, pp. 16-21-28, McGraw Hill Books, 1970.

Primary Examiner—Charles T. Jordan
Assistant Examiner—Brian Scott Steinberger
Attorney, Agent, or Firm—Robert J. Kraus

[57] ABSTRACT

Range-dependent sensitivity of an RF doppler radar apparatus is reduced to prevent false alarms when small objects move in close proximity to the apparatus' antenna. The sensitivity is reduced by periodically FM-modulating the transmitted RF signal at a frequency corresponding to a wavelength which is at least four times the operating range of the apparatus. The reflection of the transmitted signal is mixed with the transmitted signal to produce a difference frequency signal which is sampled at instants of maximum amplitude.

2 Claims, 8 Drawing Figures

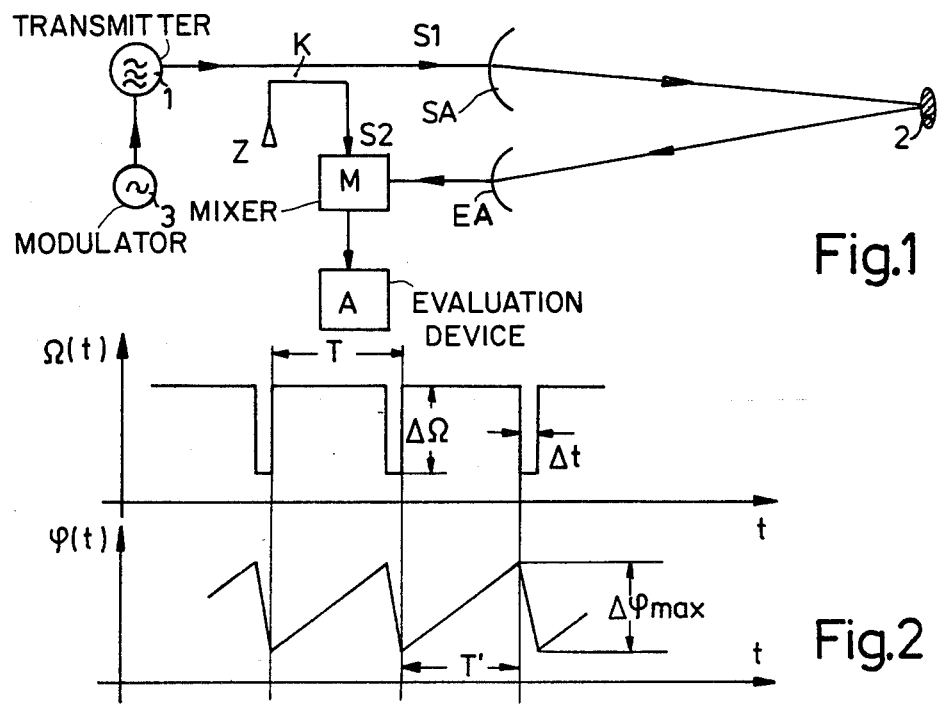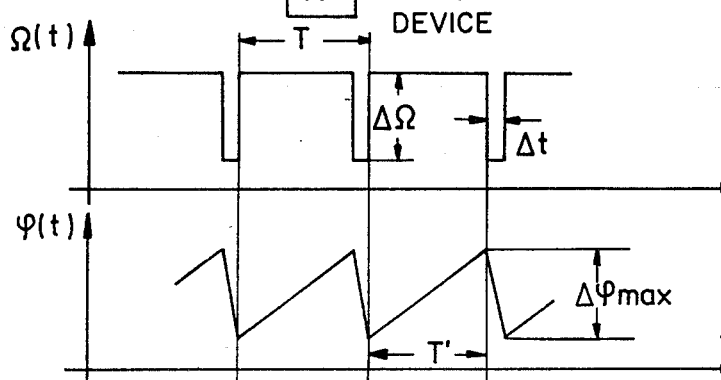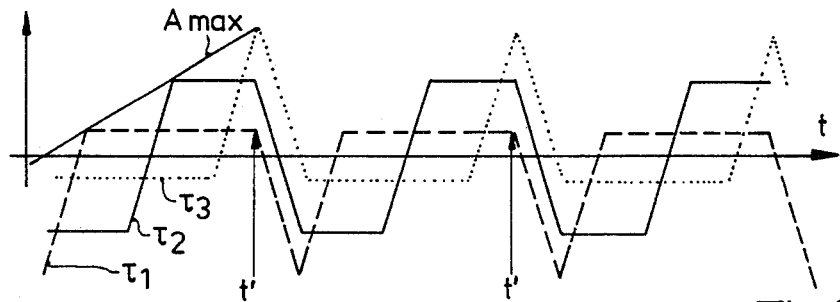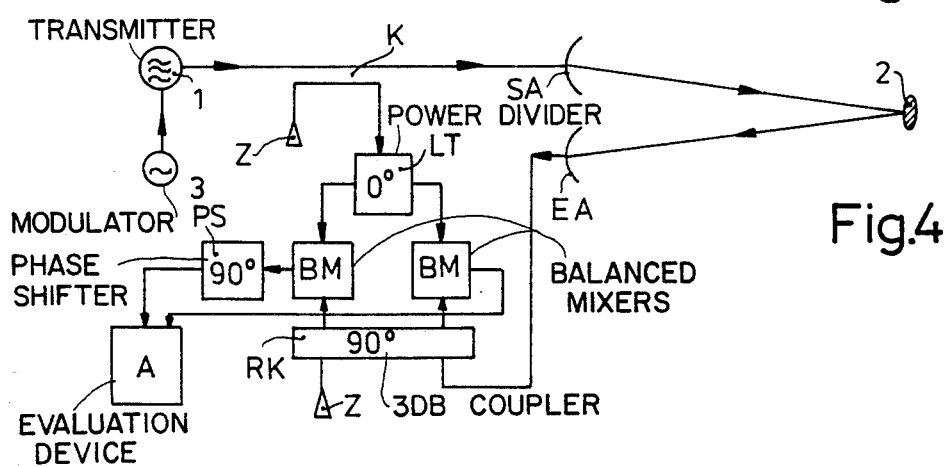

DOPPLER RADAR MEASURING APPARATUS

This is a continuation of application Ser. No. 491,005, filed May 3, 1983, which is a continuation of application Ser. No. 216,466 filed Dec. 5, 1980, both now abandoned.

BACKGROUND OF THE INVENTION

The invention relates to doppler radar measuring whereby an aerial transmits a transmit signal which is relected from a target and received by a receive aerial. A portion of the transmitted signal and the received signal are applied to a mixer which produces at its output a difference frequency signal having a frequency which is a measure of the distance to the target. The difference frequency signal is applied to an evaluation device.

Such a doppler radar measuring method may be used in alarm-surveillance systems. These systems usually monitor a room which has been left by persons authorized to be there. An alarm must be triggered as soon as an intruder moves about in the room. It is a problem in such a surveillance system to adjust the sensitivity. It has been found, for example, that comparatively small insects which fly past the aerials at short range trigger an alarm in exactly the same manner as an intruder entering the room at a distance of several meters from the aerials. Consequently, a small, nearby object triggers an alarm in precisely the same manner as a large object at a greater distance.

SUMMARY OF THE INVENTION

It is an object of the invention to reduce this distance dependency. It is desirable to provide room surveillance whereby a very small object moving close to the aerials does not trigger a false alarm, while adapting the surveillance to specific requirements, such as the size of the room to be protected.

Use is made of the fact that a pure frequency modulation is not detected when it is mixed on a carrier, because the sum of the amplitudes of the sidebands is zero. The signal must first be wholly or partly converted into an amplitude-modulated signal by means of a discriminator. This task is performed by the path of propagation, which acts as a delay line. As a result, the efficiency of the discrimination increases with distance (up to a close range) and can compensate for the distance-dependence of the doppler signal.

To scan a room or an outside area a transmit and a receiving aerial are required. Both must have a wide angle of aperture so that the whole area to be controlled is covered.

If the target is not too large, the receive aerial will receive a parasitic signal. The received signal's magnitude decreases in accordance with $1/r^2$, where r is the distance to the target. This dependence on distance causes the above-mentioned disadvantageous effects as regards the reflection caused by a small object at close range to the aerial compared with the reflection caused by an intruder to be detected in a remote area.

It is an object of the invention to compensate for the $1/r^2$ decrease of the received signal strength, resulting from room attenuation.

It is another object to reduce a $1/r$ decrease in the received signal strength itself. Such a $1/r$ decrease occurs when the reflector is very large. When exact compensation of the $1/r$ decrease in the received signal strength is achieved, a range-independent determination of the reflection properties of an object can be made.

In one embodiment of the invention, the modulation frequency fm is chosen so that its wavelength λ is greater than or equal to four times the operating range in front of the aerial.

In a further embodiment of the invention, the modulation is effected sinusoidally with the frequency fm and the peak value or the root-mean-square value of the differential frequency signal at the output of the mixer may also be used as a sample value at the frequency fm.

The frequency modulation may also be effected sinusoidally with the frequency fm and the difference frequency signal can be phase-selectively rectified with a reference signal having the frequency fm, to effect a phase-difference between the two signals which is approximately 90° for objects which are at close range to the aerial.

In addition, the frequency modulation may be effected in a pulse-shaped manner, and the difference frequency signal $S_{zf}(t)$ at the mixer output may be sampled at predetermined instants t', t' having been chosen so that the instantaneous value $U_{fd}(t')$ of the difference frequency signal is constant within the measuring range. The pulse-shaped frequency modulation produces a sawtooth phase modulation which, at the mixer output, represents a signal which is suitable for evaluation.

In one form, means for processing the signal received by the receive aerial includes a single-side-band receiver having two balanced mixers, a 0°-hybrid network, a 90°-hybrid network and an intermediate-frequency 90° phase shifter. Outputs of the 0° hybrid are connected to respective first inputs of the balanced mixers. Outputs of the 90°-hybrid are connected to respective second inputs of the balanced mixers. An output of one mixer directly and an output of the other mixer via an intermediate-frequency 90° phase shifter is connected to the evaluation device.

BRIEF DESCRIPTION OF THE DRAWING

Embodiments of the invention will now be further explained with reference to the accompanying drawing, in which FIG. 1 is a schematic representation of a doppler radar measuring arrangement.

FIG. 2 shows the instantaneous frequency Ω(t) and the phase moduation φ(t) versus the time, FIG. 3 shows the amplitude $U_{fd}$ at the mixer output versus the time, FIG. 4 shows a doppler radar measuring arrangement in accordance with the invention

DESCRIPTION OF THE PREFERRED EMBODIMENTS

Figure 5:
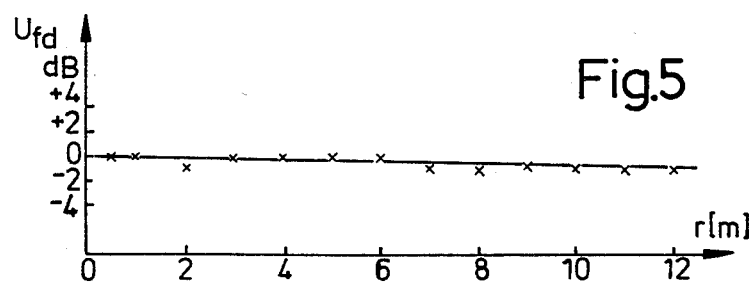
FIG. 5 shows an output signal as a function of the distance between the reflector and the aerial.

FIG. 1 shows a microwave transmitter 1, the radio-frequency power $S_1$ of which is radiated with the frequency $\Omega_0/2\pi$ via a transmit aerial SA, is reflected from an object 2, is received by a receive aerial EA and applied to a mixer M. In addition, a portion of the transmitter power, $S_2$, is applied to this mixer M via a coupler K. Z denotes a reflection-free termination. Furthermore, in accordance with the invention the microwave transmitter 1 is frequency-modulated by the modulator 3. The difference frequency signal, which is applied to an evaluation device A, is available at the mixer output.

FIG. 2 shows the instantaneous frequency $\Omega(t)$, which is frequency-modulated in a pulse-shaped manner with the amplitude $\Delta\Omega$. The duration of the modulation pulse is $\Delta t$ and the period is T. The lower portion of FIG. 2 shows the sawtooth phase modulation. $\phi(t)$ which results from this frequency modulation and which has the maximum amplitude $\Delta\phi_{max}$.

In FIG. 3 the time/amplitude variation at the output of the mixer is shown for three different propagation times $\tau_1$, $\tau_2$ and $\tau_3$. The curve $A_{max}$ represents the maximum mixer outputs for all different propagation times. The symbol t' indicates the instant within the period T which is defined in FIG. 2 at which all the amplitude variations associated with the different $\tau$ assume a maximum value.

First of all a sinusoidual frequency modulation with the modulation frequency $10^7 m/2\pi$ will be considered. It should once again be emphasized that both the transmitted signal and the mixer oscillator signal have been frequency modulated in exactly the same way, and that these signals derive from the same source.

When these conditions are satisfied the difference frequency signal $S_{ZF}(t)$ at the output of the mixer M takes the form $$S_{ZF}(t) = 2\eta \cdot A_S \cdot \Delta\phi_m \cdot \sin(\Omega_o t)\sin\frac{\omega_m\tau}{2} \cdot \cos\left(\omega_m t - \frac{\omega\tau}{2}\right) \quad (1)$$

when the requirement $$2\Delta\phi_m \cdot \sin\left(\frac{\omega_m\tau}{2}\right) \leq 1 \quad (2)$$

is satisfied. Herein $\tau$ is the propagation time from the aerial to the object and back and $\Delta\phi_m$ is the maximum phase deviation corresponding to the frequency deviation $\Delta\Omega$ of the carrier frequency, which is expressed by the relation $$\Delta\psi_m = \frac{\Delta\Omega}{\omega_m} \quad (3)$$

In equation (1) illustrates the conversion efficiency of the mixer M, $A_S$ illustrates the amplitude of the received signals and the expression $\sin(\Omega_o t)$ illustrates the actual doppler effect.

For large reflectors the propagation attenuation is proportional to the distance, and consequently to $\tau$. For constant modulation frequency $\omega_m$ the difference frequency signal is defined by:

$$S_{ZF} = K_1 \cdot \cos(\Omega_o\tau) \cdot \frac{\sin\left(\frac{\omega_m\tau}{2}\right)}{\left(\frac{\omega_m\tau}{2}\right)} \cdot \cos\left(\omega_m t - \frac{\omega_m\tau}{2}\right) \quad (4)$$

where $K_1$ = a constant.

For peak level detection at the difference frequency for $\omega_m\iota<<1$, the measured amplitude of the difference frequency signal $U_{fd}$ is constant and independent of the distance, i.e. the chosen modulation method results in an increase in the difference frequency fd with increasing distance in such a way that the increasing propagation attenuation is accurately compensated. For large reflectors the peak value of the difference frequency signal is $$S_{peak} \sim \frac{\sin\left(\frac{\omega_m\tau}{2}\right)}{\left(\frac{\omega_m\tau}{2}\right)} \quad (5)$$

wherein $S_{peak}$ is the peak amplitude.

This approximately describes the behaviour of a spatial low-pass filter. This means that up to a distance given by approximately $\omega_m \approx 2\pi$ the received signals are approximately constant. At larger distances the received signals are much smaller.

When for small scatterers the propagation attenuation of the amplitude is proportional to the square of the distance and consequently to $\tau^2$, then a phase selective rectification of the difference frequency signal can be carried out with the reference signal $$A_{ref}(t) = A_{ref}\sin(\omega_m t + \theta) \quad (6)$$

to obtain (for $\theta$=o) the demodulated signal $$A_{dem} = \frac{\sin^2\left(\frac{\omega_m\tau}{2}\right)}{\left(\frac{\omega_m\tau}{2}\right)^2} \quad (7)$$

For $\omega_m\tau<<1$ and small scatterers the propagation attenuation determined by the receiver signal can be accurately compensated. For larger $\omega_m\tau$ it is possible to approximate a spatial low-pass function.

By means of the above-described procedure the "dynamic range" to be processed in a doppler radar arrangement can be considerably reduced and, consequently, the risk of false alarms is considerably reduced.

For the case of a large reflector, and therefore a decrease in the received signal proportional to $\tau$, accurate compensation can be accomplished by a delta phase modulation. In accordance with FIG. 2 the delta phase modulation is accomplished in a simple way by means of a pulse-like frequency modulation. After mixing, a trapezoidal signal, as shown in FIG. 3, is available at the mixer output from which, in accordance with the invention, sampling values $U_{fd}(t')$ can be derived at predetermined instants, which are indicated in FIG. 3 by t'. $U(t',\tau)$ is constant, so independent of the distance r, as long as $$r \leq c \cdot \frac{\tau}{2} \quad (8)$$

where c is the velocity of light. A further assumption is that $\Delta\phi_{max}$ (see FIG. 2) remains smaller than 1, so $\Delta\Omega\cdot\Delta t<1$.

In many uses, such as in "pure" range measurement, a difference frequency signal $S_{ZF}$ is required, which directly represents the phase information of the spatial room path $\Omega_o \tau$. For this purpose, a single-sideband receiver of known type can be used. As shown in FIG. 4, this single-sideband receiver includes a power divider or 0° hybrid LT, a 3 dB-coupler or 90° hybrid RK, two balanced mixers BM and a 90° phase shifter PS at the difference frequency. The difference frequency signal is of the form $$A_{ZF} = K_2 \cdot \frac{\sin\left(\frac{\omega_m \tau}{2}\right)}{\left(\frac{\omega_m \tau}{2}\right)} \cdot \cos\left(\omega_m t + \Omega_o \tau \frac{\omega_m \tau}{2}\right) \quad (9)$$

The phase shift corresponding to the spatial room-path $\Omega_o \tau$ is represented by the phase of the difference frequency signal.

Such a doppler radar utilizes, for example, a microwave carrier frequency in the range from approximately 8 to 13 GHz. Rooms to be surveyed are, for example, 20 m long. The distance to the zero sensitivity position, as will be further explained with reference to FIG. 6, is then at $\lambda/4$ and the constant amplitude range, as further explained hereafter with reference to FIGS. 5 and 8, extends over $\lambda/8$. For these examples, the wavelength $\lambda$ of the modulation frequency must be larger than or equal to 8 times the length of the room. For a room which is, for example, 20 m long the wavelength must be 160 m, which corresponds to a modulation frequency of 2 MHz.

Figure 6:
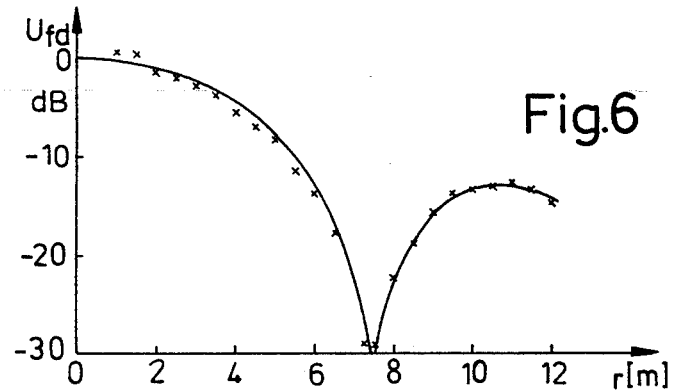
FIG. 6 shows the amplitude of the differential frequency signal as a function of the distance, when a large reflector is used.

FIG. 5 shows the output signal, measured with a small reflector, and a phase-selective rectification as a function of the distance between the reflector and the aerial.

FIG. 6 shows the amplitude of difference frequency signals as a function of distance when a large reflector is used. The amplitude is substantially constant for a range up to 3 m and the zero position of the sensitivity is at approximately 7.5 m.

Figure 7:
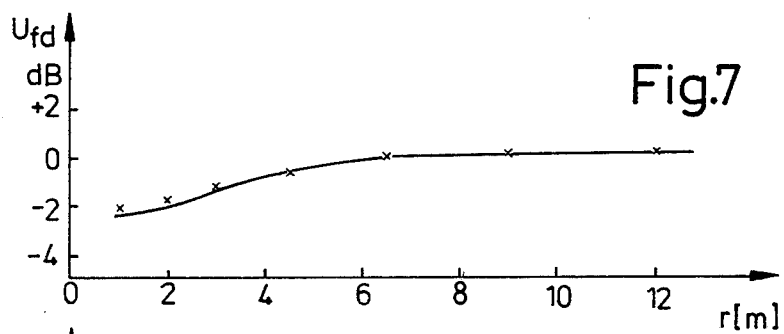
FIG. 7 shows the amplitude of the differential frequency signal as a function of the distance, when a small reflector is used

FIG. 7 shows the amplitude of the difference frequency signal for a small reflector and phase-selective rectification, the phase difference between the signal and the mixer inputs being approximately 90°, as a function of the distance for objects which are at very close range to aerial.

Figure 8:
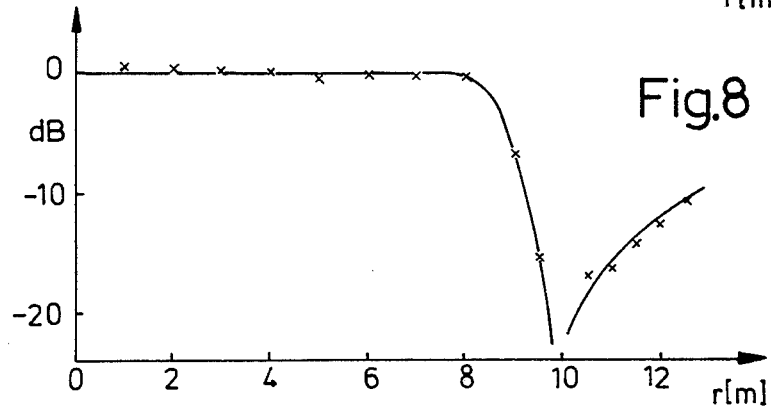
FIG. 8 shows the amplitude values measured at the instants t' as a function of the distance.

FIG. 8 shows the amplitude values, measured at the instants t' shown in FIG. 3 in the case of pulse-like frequency modulation, as a function of the distance. The differential frequency amplitude is independent of distance up to a distance of approximately 8 m.

What is claimed is:

1. A doppler radar apparatus for surveillance of an area lying within a predetermined operating range, comprising:
   (a) a transmitter for producing a radio frequency signal at an output thereof;
   (b) a modulator coupled to the transmitter for momentarily modulating said radio frequency signal during succesive periods of duration T at a predetermined modulation frequency, said modulation frequency corresponding to a wavelength which is at least four times the operating range of the apparatus;
   (c) a transmit antenna coupled to the transmitter for transmitting the modulated radio frequency signal across the area;
   (d) a receive antenna for receiving a reflection of the transmitted signal from an object within the area;
   (e) mixer means coupled to said transmitter output and to said receive antenna for mixing the transmitted and received signals and for producing a difference frequency signal representing the range of said object, said mixer means comprising:
      (1) a power divider for coupling the transmitter output to first and second outputs thereof;
      (2) a 90° coupler having an input coupled to the receive antenna and having first and second outputs for providing 90° phase-shifted replicas of the received signal;
      (3) a first balanced mixer coupled to the first output of each of the power divider and the 90° coupler for mixing the transmitted signal and one of the replicas of the received signal, and for producing at an output thereof a first difference frequency signal;
      (4) a second balanced mixer coupled to the second output of each of the power divider and the 90° coupler for mixing the transmitted signal and the other one of the replicas of the received signal, and for producing at an output thereof a second difference frequency signal; and
      (5) a 90° phase shifter coupled to the output of the first balanced mixer for producing at an output of the phase shifter a 90° phase-shifted replica of the first difference frequency signal; and
   (f) an evaluation device, coupled to the outputs of the 90° phase shifter and the second balance mixer, for sampling the difference frequency signal during each period at a predetermined instant when the difference frequency signal amplitude is a maximum.

2. A doppler radar apparatus as in claim 1 wherein said modulator effects sinusoidal modulation of the radio frequency signal.

* * * * *